United States Patent [19]
Kozuki et al.

[11] 4,086,603
[45] Apr. 25, 1978

[54] ELECTRICAL DRIVING CIRCUIT OF CAMERA

[75] Inventors: Susumu Kozuki; Takashi Uchiyama; Tadashi Ito, all of Yokohama; Tomonori Iwashita, Fuchu; Masanori Uchidoi, Yokohama; Yukio Mashimo, Tokyo, all of Japan

[73] Assignee: Canon Kabushiki Kaisha, Tokyo, Japan

[21] Appl. No.: 635,323

[22] Filed: Nov. 26, 1975

[30] Foreign Application Priority Data

Nov. 27, 1974 Japan ............................ 49-136845

[51] Int. Cl.² ............................................ G03B 17/42
[52] U.S. Cl. ................................. 354/204; 354/23 D; 354/173; 354/266
[58] Field of Search .............. 354/23 D, 29, 34, 38, 354/43, 44, 50, 51, 60 R, 105, 106, 108, 170, 171, 173, 204, 205, 206, 212, 213, 234, 235, 266

[56] References Cited
U.S. PATENT DOCUMENTS

| | | | |
|---|---|---|---|
| 3,688,669 | 9/1972 | Ogiso et al. | 354/171 |
| 3,852,779 | 12/1974 | Yamamichi et al. | 354/173 |
| 3,893,136 | 7/1975 | Ando et al. | 354/173 |
| 3,898,679 | 8/1975 | Ogiso et al. | 354/173 |
| 3,903,534 | 9/1975 | Ito | 354/234 |
| 3,940,776 | 2/1976 | Kondo | 354/173 |

*Primary Examiner*—Russell E. Adams
*Attorney, Agent, or Firm*—Toren, McGeady and Stanger

[57] ABSTRACT

The present invention relates to an electrical driving circuit of a camera, particularly for preventing the misoperation of the release, whereby an interval timer for controlling a constant period of taking photographs is provided so as to carry out the release operation with the period controlled by the interval timer, while the operation state of the film winding up means of the camera is detected in such a manner that the release operation with the period of the interval timer is prohibited when the operation of the film winding up means has not been completed before the release operation with the period of the interval timer.

14 Claims, 9 Drawing Figures

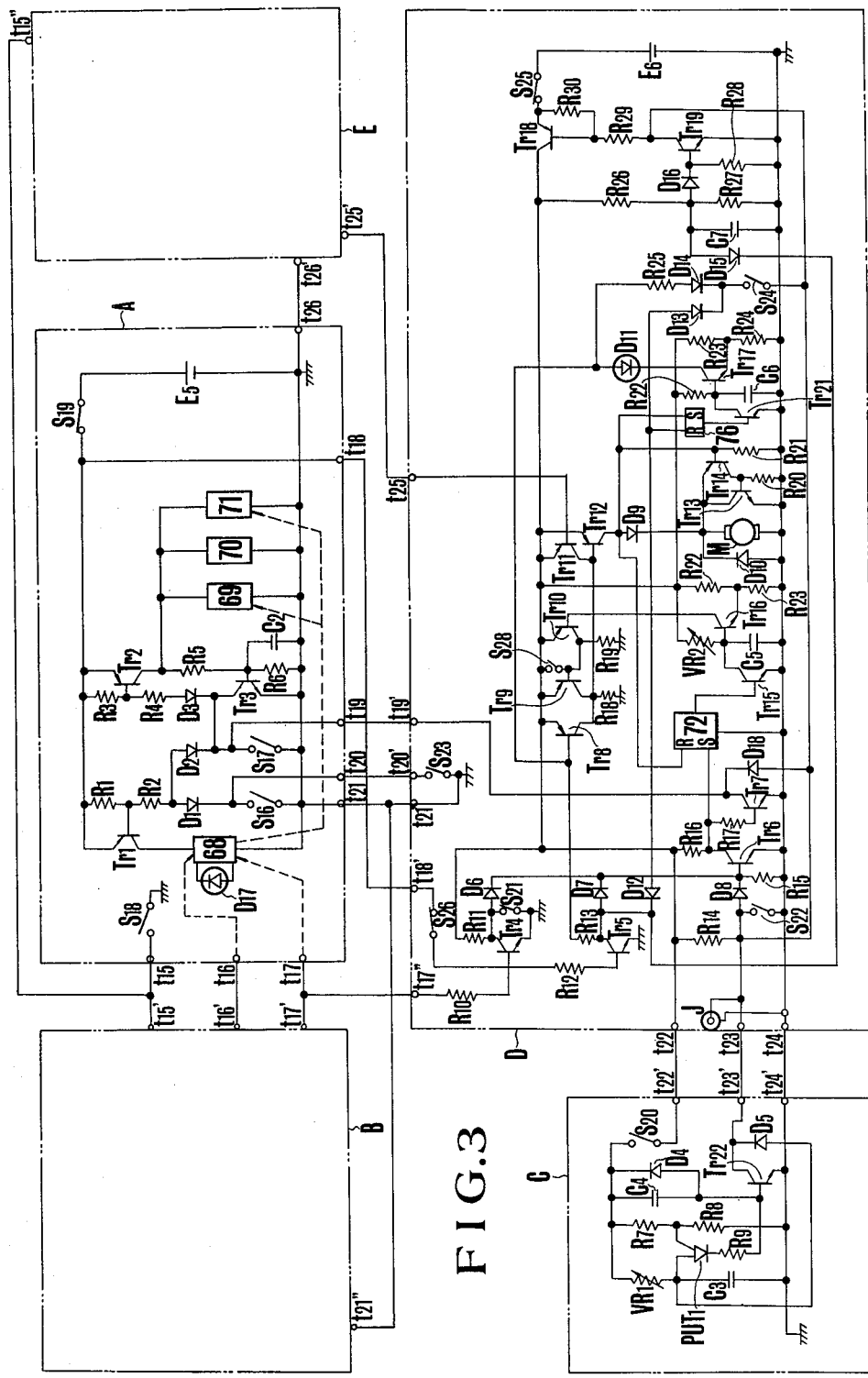
F I G. 3

ELECTRICAL DRIVING CIRCUIT OF CAMERA

Field of the Invention

The present invention relates to an electrical driving circuit of a camera for controlling the period of the release operation in case of taking photographs continuously.

DESCRIPTION OF THE PRIOR ART

The automatic exposure camera which automatically decides the condition for the proper exposure can roughly be divided into two types. Namely the camera with priority on shutter time wich automatically decides the proper aperture value, while the shutter time is set in advance and the camera with priority on aperture value which automatically decides the proper shutter time while the aperture value is set in advance. In case the automatic exposure camera is electrically driven so as to take several photographs with short period, the film is wound up by the exposure completion signal (for example the signal for the running of the rear shutter plane) immediately after the exposure of the first picture and the shutter is immediately released for the second picture by the film winding up completion signal. The period in this case is represented:

Photographing period = Exposure time (shutter
time) + winding up time        (1)

Suppose that the winding up time be constant, the photographing period can is nearly constant in case of the camera with priority on shutter time because the exposure time is constant while in case of the camera with priority on aperture value the exposure time is variable so that the photographing period are also variable whereby it is possible to take photographs with a certain determined period. In order to eliminate this difficulty, it is proposed that a release timer at which a time longer than the exposure time can be set is provided so as to start the counting synchronized with the shutter releasing whereby the count completion signal of the release timer and the exposure completion signal are delivered to the AND gate by whose output the winding up is started. The photographing period is represented:

Photographing period = Time controlled by release
timer + winding up time        (2)

(Hereby the time controlled by the release timer is longer than the exposure time.) Hereby the time controlled by the release timer is constant so that the photographing period becomes almost constant, while the winding up time is variable due to the fluctuation of the source voltage, of the film winding up and so on so that it is possible to make the photographing period fully constant. Even in case of the camera with priority on shutter time it is impossible to make the photographing period fully constant in case the photographing period is determined by the equation (1).

Further in case a speed light device is used with the camera to be driven electrically so as to take photographs continuously, it is essential that the speed light device should have been charged before the shutter releasing, while in the conventional way this difficulty is eliminated by using a speed light device whose recycling time is shorter than the photographing period of the camera. However, in this system there exists an inherent undesirable feature in that in case the recycling time of the speed light system becomes longer due to the voltage drop of the current source and so on, the exposure becomes insufficient or in the extreme case the speed light device does not operate.

SUMMARY OF THE PRESENT INVENTION

The principal purpose of the present invention is to offer an electrical driving system of a camera, in which an interval timer for controlling the photographing period from the shutter release operation to the next shutter release operation is provided so as to keep the photographing period constant even when the film winding up time is varied, while the film winding up completion signal and the completion signal of the above mentioned interval timer are delivered to an AND gate whose output serves as the shutter release signal in such a manner that a photograph can be taken immediately after the completion of the winding up operation even when the shutter time becomes too long to complete the film winding up within the determined photographing period.

Another purpose of the present invention is to offer an electrical driving device of a camera in which the speed light device can deliver the proper exposure light amount in case the continuous photography is carried out with the speed light, by using the output of the AND gate to which the charge completion signal from the speed light device and the completion signal of the film winding up, as shutter release signal.

Further, another purpose of the present invention is to offer an electrical driving circuit for a camera in which the film is not wound up before the registration of the photographic data has been completed by the illuminating diode for the data registration even if the exposure by the shutter has been completed, because the exposure time for the shutter is different from the exposure time of the illumination diode for data registration in case the data such as the date is to be registered on the film.

Further, another purpose of the present invention is to offer an electrical driving circuit for a camera in which a release period control means is provided so as to keep the shutter release period constant, while in case the film winding up operation has not yet been completed within the above mentioned period, the shutter release operation is stopped so as to avoid the misoperation.

Further, other purposes of the present invention will be disclosed from the explanations to be made in detail in accordance with the embodiments shown in the accompanying drawings.

BRIEF DESCRIPTION OF THE DRAWINGS

FIG. 3 shows a circuit diagram of an embodiment of the present invention.

DESCRIPTION OF THE PREFERRED EMBODIMENT

Figure 1:
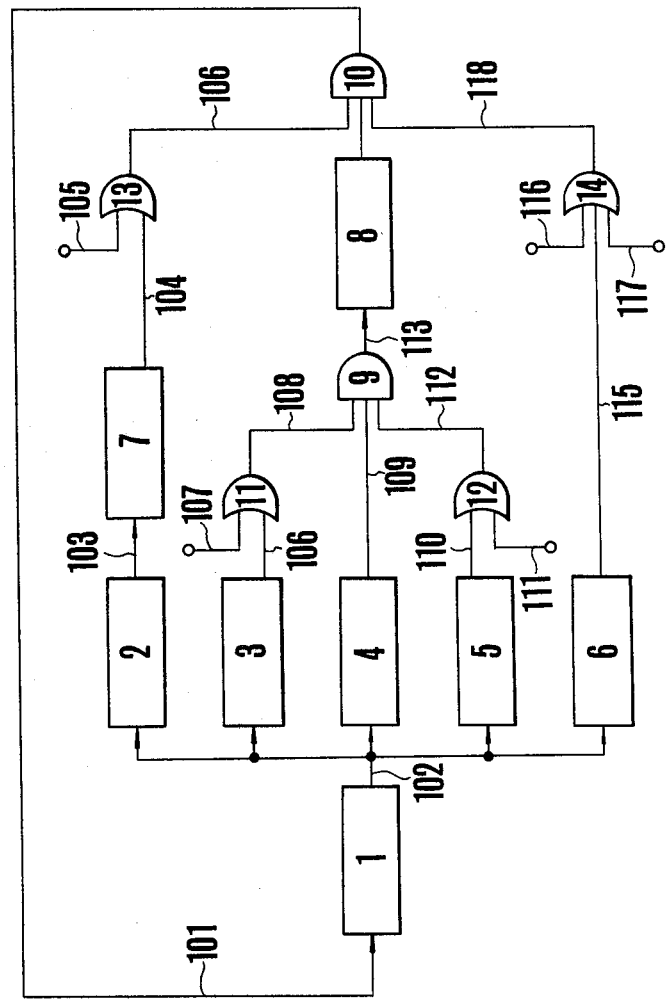
FIG. 1 shows a block circuit diagram of the fundamental composition of the electrical driving circuit of camera in accordance with the present invention.

FIG. 1 shows a block diagram for explaining the principle of the present embodiment. In FIG. 1, 1 is the shutter release means, 2 the speed light control means, 3 the data registration control means, 4 the shutter time control means, 5 the release timer control means, 6 the interval timer control means, 7 the speed light charging means and 8 the film winding up means. 9 and 10 are AND gates while 11, 12, 13 and 14 are OR gates. Hereby 101 to 118 show the input signals and the output signals of the above mentioned means.

The the operation of the present invention will be explained below in accordance with FIG. 1. In case photographs are taken continuously while the camera is electrically driven, at first the photographer gives a shutter release start signal 101 to the shutter release means 1, for example, by pushing down the shutter release (not shown in the drawing) manually. The shutter release means 1 releases the shutter, at the same time, delivering the exposure start signal 102 to the speed light control means 2, the data registration control means 3, the shutter time control means 4, the release timer control means 5 and the interval timer control means 6. In case the speed light is used, the speed light device is so controlled by the speed light control means 2 as to deliver a certain determined amount of the speed light, delivering the speed light completion signal 103 to the speed light charging means 7. The speed light charging means 7 charges the main condenser of the speed light device, delivering the charge completion signal 104 at the termination of charging. The charge completion signal 104 is the first input signal of the OR gate 13. The second input of the OR gate 13 is the speed light switching off signal 105, which is provided in case the speed light device is not used. The OR gate 13 delivers the speed light preparation completion signal 106 in case either the charge completion signal 104 or the speed light switching off signal 105 is put in the OR gate 13. The speed light preparation completion signal 106 is the first input signal of the AND gate 10.

In case data such as the date is desired to be registered on the photograph, the data provided in inadvance is registered on the film by means of the data registration control means 3 through an illuminating diode during the proper exposure time, delivering the registration completion signal 106 at the termination of the registration. This registration completion signal 106 is the first input signal of the OR gate 11. The second input signal of the OR gate 11 is the data switching off signal 107, which is put in only when no data registration is carried out. The OR gate 11 delivers the data registration completion signal 108, when either of the registration completion signal 106 or the data switching off signal 107 is put in the gate 11. The data registration completion signal 108 is the first input signal of the AND gate 9.

Further, the exposure start signal 102 is put in the shutter time control means 4, which counts the adjusted shutter time and closes the shutter at the termination of the counting, delivering at the same time, the exposure completion signal 109. This exposure completion signal 109 is the second input signal of the AND gate 9. Further the exposure start signal 102 is put in the release timer control means 5, which counts the set time, delivering the release timer completion signal 110 at the termination of the counting. This release timer completion signal 110 is the first input signal of the OR gate. The second input signal of the OR gate 12 is the release timer switching off signal 111, which is put in only when the release timer is not used. The OR gate 12 delivers the release completion signal 111 when either the release timer completion signal 110 or the release timer switching off signal 112 is put in the gate 12. This release completion signal 112 is the third signal of the AND gate 9. The AND gate 9 delivers the winding up start signal 113 to the winding up means 8 when all the data registration completion signal 108, the exposure completion signal 109 and the release completion signal 112 are put in the gate 9. Then the film winding up means 8 winds the film up, delivering the winding up termination signal 114 at the termination of the film winding up. This winding up completion signal 114 is the second input signal of the AND gate 10.

Further, the exposure start signal 102 is put in the interval timer control means 6, which counts the set time, delivering the interval timer completion signal 115 at the termination of the counting. The interval timer completion signal 115 is the first input signal of the OR gate 14. The second input signal of the OR gate 14 is the interval timer switching off signal 116, which is put in only when the interval timer is not used. The third input signal of the OR gate 14 is the external trigger signal 117, which is put in only when the shutter is released by means of the external trigger device. The OR gate 14 delivers the interval completion signal 118 when either of the interval timer completion signal 115, the interval switching off signal 116 or the external trigger signal 117 is put in the gate 14. This interval completion signal 118 is the third input signal of the AND gate 10. The AND gate 10 delivers the shutter release start signal 101 to the shutter release means 1 when all the speed light preparation completion signal 106, the film winding up completion signal 114 and the interval completion signal 118 are put in the gate 10. The shutter releases means 1 release the shutter and initiates the cycle again, by means of the repetition of which operation photographs can be taken continuously.

Figure 2:
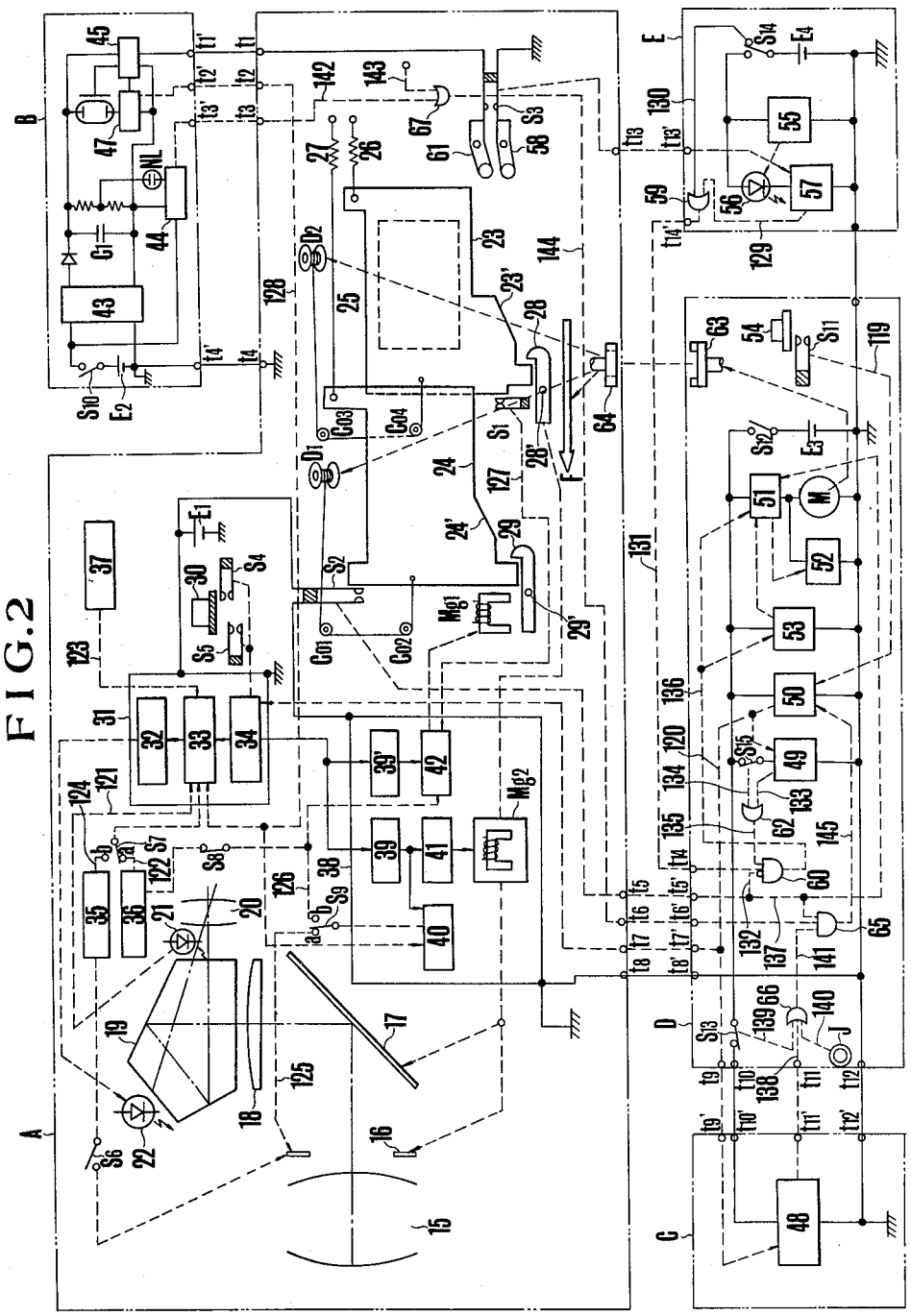
FIG. 2 shows a block circuit diagram of an embodiment of the electrical driving circuit of camera in accordance with the present invention.

FIG. 2 shows the composition of the important parts of the circuit in a case where the electrical driving system in accordance with the block diagram shown in FIG. 1 is built in a single reflex camera with priority on both modes (a full automatic single reflex camera with priority on shutter time or aperture value). In FIG. 2, A shown in dotted line is the camera body, B the speed light device, C the interval timer, D the electrical driving device and E the data registration device. The dotted lines are the transmission routes of the signals, while the figures such as 101 accompanying the routes show the signal. In the camera body A, 15 to 20 show the optical system of the single reflex camera, namely 15 the photographic lens, 16 the diaphragm, 17 the mirror, 18 the condenser lens, 19 the pentagonal prism and 20 the eye piece lens. 21 is the light sensing element provided at the eye piece part, 22 the display means such as illuminating diode for finder display indicating the shutter time, the aperture value and so on. 23 to 29 the important components of the focal plane shutter of the single reflex camera, whereby 23 the front shutter plane, 24 the rear shutter plane, 25 the aperture part, 26 the spring for driving the front shutter plane, 27 the spring for driving the rear shutter plane, 28 the front shutter plane holding lever and 29 the rear shutter plane holding lever. $S_1$ is the count start switch of the electronic shutter functionally engaged with the running of the front shutter plane, $S_2$ the safety switch which is opened from the film winding up completion (termination of the rear shutter plane charge) till the start of the rear shutter plane, $S_3$ is the X contact switch for the speed light which switch is opened from the running termination of the front shutter plane till the running termination of the rear shutter plane and $Mg_1$ the magnet for driving the rear shutter plane.

30 is the release button of the camera body, $S_4$ the light measurement-indication switch which is opened by the first stroke of the release button 30 and $S_5$ the exposure control-shutter release switch which is opened by the second stroke of the release button 30. 31 is the circuit including the indication circuit 32, the light measurement circuit 33 and the shutter release circuit 34, being directly connected to the current source $E_1$ in the camera body. 35 is the photographic aperture information source to be manually set in case the camera is used with priority on aperture value. 36 is the shutter time information source to be manually set in case the camera is used with priority on shutter time. 37 is the film sensitivity information source, whereby in case the camera is used with priority on shutter time, the informations from the shutter time information source 36 and from the film sensitivity information source 37 are put in the light measuring circuit, while in case the camera is used with priority on aperture value, the informations from the photographic aperture information source 35 and from the film sensitivity information source 37 are put in the light measuring circuit. 38 is the circuit including the self-holding circuit 39, 39' as switching means, the exposure control circuit 40, the release mechanism driving circuit 41 and the shutter time control 42 corresponding to 4 in FIG. 1, being connected to the current source $E_1$ in the camera body through the safety switch $S_2$.

Consequently it is possible to bring the light measuring circuit 33 and the indication circuit 32 always into operation state by simply pushing down the release button 30, while the exposure control circuit 40, the release mechanism driving circuit 41 and the shutter time control circuit 42 are closed only from the charge completion of the rear shutter plane 24 till the start of the rear shutter plane, while the safety switch $S_2$ is closed. $Mg_2$ is the release magnet for controlling the driving of the aperture 16, the lifting of the mirror 17 and the starting of the front shutter plane 23. $S_6$ to $S_9$ are the switches to be changed over whether the camera is used with priority on shutter time or with priority on aperture value. $D_1$ and $D_2$ are the drums to be rotated by the film winding up couplers 63 and 64 in functional engagement with the moter M, whereby on these drums the winding up wires connected to the shutter planes through the rollers $CO_1$, $CO_2$, $CO_3$ and $CO_4$ are wound up.

Below, the composition of the speed light device will be explained. In the speed light device B, the voltage step up circuit is connected to the current source $E_2$ of the speed light device through the main switch $S_{10}$. 44 is the switching circuit for lighting the neon tube NL and delivering the charge completion signal to the side of the camera when the main condenser $C_4$ has been charged, composing together with C, 43 and NL the speed light device charging means corresponding to 7 in FIG. 1. 45 the actuating circuit for actuating the discharge tube 46 by the closing signal of the X contact $S_3$ in the camera body. 47 is the speed light amount control circuit for controlling the amount of the speed light.

In the interval timer C, 48 is the interval timer circuit corresponding to 6 in FIG. 1. In the electrical driving device D, 49 is release timer circuit corresponding to 5 in FIG. 1, 50 the release circuit, 51 the switching circuit for controlling the switching on and off of the moter M for winding up the film and 52 the brake circuit for the moter M. 53 is the delay circuit for automatically stopping the moter M in case even after the elapse of the determined time, the motor M does not complete the film winding up. 54 is the release button at the side of the electrical driving device, $S_{11}$ the release switch at the side of the electrical driving device, $E_3$ the current source of the electrical driving device and $S_{12}$ the main switch of the electrical driving device. $S_{13}$ is the switch for deciding whether the interval timer C is used or not.

In the data registration device E, 55 is the data input circuit consisting of for example ten keys. 56 is the illuminating diode for registering the data put in the data input circuit 55. Illuminating diode 56 is provided in the back cover of the camera and is projected on the film through an optical system, not shown in the drawing. 57 is the registration control circuit corresponding to 3 in FIG. 1, for controlling the lighting time of the illuminating diode 56, $S_{14}$ the main switch of the data registration device E and $E_4$ the current source of the data registration device.

Below the operation of the electrical driving system compared as mentioned above for the camera will be explained. (Hereby suppose that the camera body A and the electrical driving device D are in the wound up state of the film and further the speed light device B is in the charged state in case the speed light device B is used) when the release switch $S_{11}$ is closed, the release button 54 in the electrical driving device D being pushed down, the release circuit 50 is closed by means of the start signal 119 so as to deliver the shutter release start signal 120 to the shutter release circuit 34 in the camera body A through the terminals $t_7$ and $t_7'$ and at the same time to the interval timer circuit 48 in the interval timer C through the terminal $t_9$ and $t_9'$. In case $S_{13}$ is closed the interval timer circuit 48 starts to count the set time (namely in case the interval timer is used). The shutter release start signal 120 is further delivered to the release timer circuit 49 in such a manner that the release timer circuit 49 starts to count the set time. Further because the shutter release circuit 34 is closed while the circuit 31 is closed, the indication circuit 32 and the light measuring circuit are also closed. In case the camera is used with priority on shutter time, the switch $S_6$ is opened, $S_8$ closed and both $S_7$ and $S_9$ switched over to the side a as is shown in the drawing. In consequence the object brightness information 121 from the light sensing element 21, the shutter time signal 122 set in advance in the shutter time information source 36 and the film sensitivity signal 123 from the film sensitivity source 37 are put in the light measuring circuit 33. Further in case the camera is used with priority on aperture value, the switch $S_6$ is closed, $S_8$ opened and both $S_7$ and $S_9$ are changed over to the side b. In consequence, the object brightness information 121 from the light sensing element 21, the photographic aperture signal 124 set in advance in the photographic aperture information source 35 and the film sensitivity signal 123 from the film sensitivity information source 37 are put in the light measuring circuit 33. (Hereby the aperture 16 is manually preset). The light measuring circuit 33 carries out the light measurement in accordance with the above mentioned information so as to deliver the outputs present at that time, namely the aperture value, the shutter time and so on to the indication circuit 32. The indication circuit 32 indicate the aperture value, the shutter time and so on in accordance with the outputs from the light measuring circuit 33 in the view finder by means of the illuminating diode 22 an indication means. Further the camera is in the wound up state so that the shutter has been charged, whereby the safety switch $S_2$ is closed while the circuit 38 is closed. Hereby in the circuit 38 at first the self-holding circuit 39 and 39' starts to operate so as to keep the circuit 38 closed until the exposure is completed, even if the release switch $S_{11}$ is opened by releasing the pushing down of the release button 54 in the device 54. At the same time exposure control circuit 40 starts to operate so as to deliver the proper aperture value determined by the light measuring circuit 33 as preset aperture signal 125 to the aperture 16 through the side a of the switch $S_9$, in case the camera is used with priority on shutter time, so as to preset the aperture 16. In case the camera is used with priority on the aperture value the proper shutter time determined by the light measuring circuit 33 is delivered to the shutter time control circuit as a shutter time signal 126 through the side b of the switch $S_9$. On the other hand, at the same time the release mechanism driving circuit 41 starts to operate so as to actuate the magnet $Mg_2$ for the release, closing the aperture 16 down to the preset aperture value (the aperture value set in advance in case the camera is used with priority on aperture value and the aperture value determined by the preset aperture signal 125 in case the camera is used with priority on shutter time), and lifting the mirror 17 and then rotating the front shutter plane holding lever 28 clockwise around the shaft 28' so as to release the engagement of the front shutter plane 23. Thus the front shutter plane 23 starts to run along a direction opposite to the arrow F in the drawing by means of the spring 26. When the front shutter plane 25 starts to run, the shutter time control circuit 42 starts to count the shutter time adjusted by the shutter time control circuit 42 (the shutter time set in advance in case the camera is used with priority on shutter time and the shutter time determined by the shutter time signal 126 in case the camera is used with priority on aperture value) by means of the exposure start signal 127 from the count start switch $S_1$.

When the front shutter plane 23 leaves the aperture part 25, the inclined part 23' of the front shutter plane rotates the lever 58 counterclockwise so as to close the X contact switch $S_3$. In case the speed light device is used, when the X contact switch $S_3$ is closed the actuating circuit 45 in the speed light device B is closed through the terminal $t_1$ and $t_1'$ so as to actuate the discharge tube 46. When the discharge tube 46 operates, the light beam reflected by the object is sensed by the speed light amount control circuit 47 so as to stop the operation of the discharge tube at the point in time at which the discharge tube 46 has produced the proper speed light amount. Thus the main condenser $C_1$ starts to be charged from the beginning. When the X contact $S_3$ is closed the registration control circuit 57 in the device E is closed through the terminals $t_{13}, t_{13}'$, in case the data is registered, in such a manner that the illuminating diode 56 lights up based upon the data put in advance by the data input circuit 55. When the registration has been completed with the proper exposure by means of the illumination diode, the registration control circuit 57 is opened, delivering the registration completion signal 129 to the OR gate 59 corresponding to 11 in FIG. 1. The second input signal of the OR gate is the data switching off signal 130 obtained by opening the main switch $S_{14}$ of the data registration device E. In consequence, in case the data is not registered or in case the data has been registered, the OR gate delivers the data registration completion signal 131. This data registration completion signal 131 is the first input signal of the AND gate 60 corresponding to the gate 9 in FIG. 1, of the device through the terminals $t_{14}, t_{14}'$.

When the adjusted time has been counted the shutter time control circuit 42 in the circuit 38 actuater the magnet $Mg_1$ for driving the rear shutter plane. When the magnet $Mg_1$ is actuated, the rear shutter plane holding lever 29 is rotated clockwise around the shaft 29', whereby the rear shutter plane 24 runs along a direction opposed to the arrow F in the drawing by means of the spring 27. As soon as the exposure has been completed the safety switch $S_2$ is opened and the inclined part 24' of the rear shutter plane 24 rotates the lever 61 counterclockwise so as to open the X contact switch $S_3$. When the safety switch $S_2$ is opened the circuit 38 is switched off, whereby the exposure completion signal 132 is delivered as the second input signal to the AND gate 60 in the electrical driving device D from the safety switch $S_2$ through the terminals $t_5$ and $t_5'$.

The release timer completion signal 133 is delivered as the first input signal to the OR gate 62 corresponding to the gate 12 in FIG. 1 from the release timer circuit 49 in the device D. Further the second input signal of the OR gate 62 is the release timer switching off signal 134 obtained by opening the switch $S_{13}$. Thus in case the release timer is not used or in case the release timer has counted the determined time, the OR gate 62 delivers the release completion signal 135. The release completion signal 135 is delivered as the third input signal to the AND gate 60. Thus the AND gate 60 delivers the winding up start signal 136 to the switching circuit 51 and the delay circuit 53 at the point in time at which the rear shutter plane 24 has run in case the release timer and the data registration are not carried out and at the point in time at which the rear shutter plane 22 has run, after the release timer has counted the determined count and the data registration has been completed, in case the release timer and the data registration are carried out. The winding up start signal 136 is put in the delay circuit 53, which then starts to count the determined time. (Hereby it is necessary to select the delay time to be set in the delay circuit 53 a little longer than the ordinary winding up time. Suppose that the winding up time varies between 150 ms and 300 ms due to fluctuations of the voltage of the current source $E_3$ in the electrical driving device D, it is necessary to set the delay time in the delay circuit 53 up to about 500 ms. When the switching circuit 51 is closed and the motor M starts to rotate, the front shutter plane 23 and the rear shutter plane 24 is moved along the direction of the arrow F through the winding up couplers 63, 64 and drums $D_1$, $D_2$ in the electrical driving device D and the camera body A, so as to charge the shutter as well as to wind up the film by means of the conventional winding up mechanism functionally engaged with the above mentioned couplers. At the termination of the winding up operation the shutter charge has also completed, so that the safety switch $S_2$ is closed whereby a winding up completion signal 137 is delivered as the first input signal to the AND gate 65 corresponding to the gate 10 in FIG. 1, while the switching circuit 51 is opened so as to interrupt the current supply to the motor M. Then the motor M stops quickly, being braked by means of the braking circuit 52.

When the winding up operation is made normally, the switching circuit 51 opens by the signal produced when the safety switch $S_2$ is closed because the delay time of the delay circuit 53 is set a little longer than the time to be spent for winding up operation in such a manner that the motor M stops, being braked by the braking circuit 52. In such a case that for example, the film is consumed during the winding up operation and the winding up mechanism stops even after the elapse of the delay time of the delay circuit 53, the safety switch $S_2$ is not opened and therefore the switching circuit $S_2$ is kept closed, still keeping the current supply to the motor M, whereby the switching circuit 51 is opened by the count termination signal from the delay circuit 53 so as to interrupt the current supply to the motor M.

When the above mentioned interval timer circuit 48 terminates the counting of the determined time, the circuit 48 delivers as the first input signal the interval timer termination signal 138 to the OR gate 66 corresponding to the gate 14 in FIG. 1, of the device D through the terminals $t_{11}$, $t_{11}'$. The second input signal of the OR gate 66 is the interval timer switching off signal 139, produced when the switch $S_{13}$ is opened. Further the third input signal of the OR gate 66 is the trigger signal of the oscilloscope to be put in from the external trigger terminal J, namely the external trigger signal 140 due to the movement of the object to be photographed. Therefore, the OR gate 66 produces the interval termination signal 141 when the interval timer is not used, the external trigger signal is put in or the interval timer terminates the counting of the determined time. The interval termination signal 141 is the second input signal of the AND gate 65.

When the main condenser has been charged after the operation of the speed light device B, the neon lamp NL lights up and the switching circuit 44 is closed, at the same time, delivering the charge completion signal 142 as the first input signal to the OR gate 67 corresponding to the gate 12 in FIG. 1 through the terminals $t_3$, $t_3'$. The second input signal to the OR gate 67 is the speed light switching off signal 143 to be produced when the speed light device is not used. Therefore, when the speed light device is not used or when the speed light device has been charged the speed light device produces the speed light preparation completion signal 144. The speed light preparation completion signal 144 is the third input signal to the AND gate 65 of the device D through the terminals $t_6$, $t_6'$. Thus the AND gate 65 delivers the shutter release starting signal 145 to the release circuit 50, when the film has been wound up, the interval has been terminated and the speed light device has been ready for operation. Thus, the release circuit operates the shutter release from the beginning. By repeating the above mentioned operation, photographs can be taken continuously.

FIG. 3 shows an embodiment of the circuit diagram of the electrical driving circuit in FIG. 2. In FIG. 3, A is the camera body, B the speed light device, C the interval timer, D the electrical driving device and D the data registration device.

In the camera body A, 68 is the light measurement indication circuit, 69 the exposure control circuit, 70 the release mechanism driving circuit and 71 the shutter time control circuit.

$S_{16}$ of the device A is the switch which is closed by the first stroke of the shutter release button and actuates the light measurement-indication circuit 68. $S_{19}$ is the switch which is closed by the second stroke of the shutter release button and actuates the release mechanism driving circuit 70, the exposure control circuit 69 and the shutter time control circuit 71.

$Tr_1$ is the current source control transistor of the light measurement circuit 68, $Tr_2$ the current source control transister of the exposure control circuit 69, the release mechanism driving circuit 70 and the shutter time control circuit 71, whereby $Tr_3$ and $Tr_2$ compose a self-holding circuit. $R_1$ to $R_6$ are the resistances, $D_1$ to $D_3$ the diodes, $D_{17}$ the photoelectric element, $C_2$ the misoperation prevention condenser, $t_{15}$ to $t_{17}$ the speed light engagement terminals and $t_{18}$ to $t_{21}$ the electrical driving device engagement terminals. $S_{18}$ is the X contact switch for synchronization.

$S_{19}$ is the safety switch which is closed at the termination of the winding up operation and opened when the rear shutter plane has run and $E_5$ the current source. These components are connected as is shown in the drawing.

Figure 4:
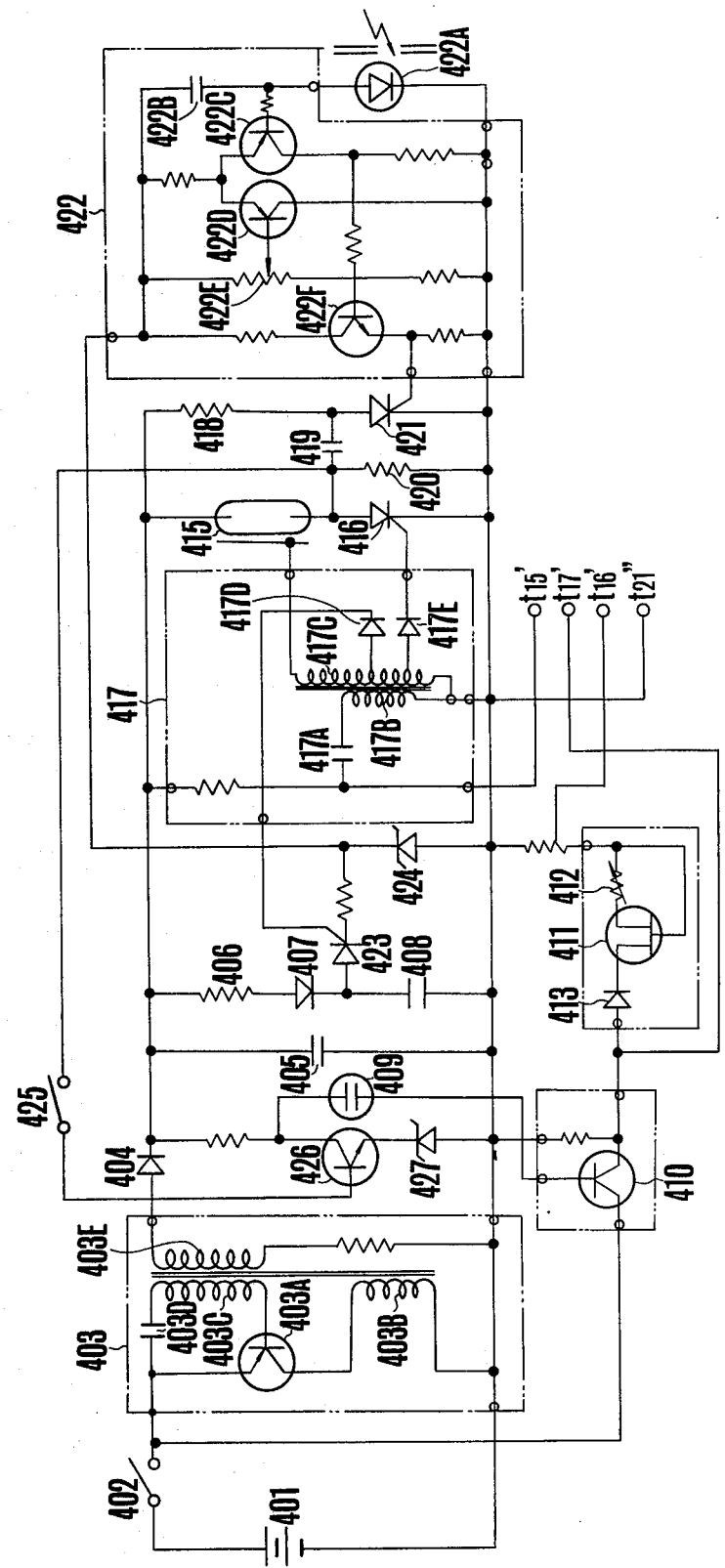
FIG. 4 shows a circuit diagram of an embodiment of the speed light (B) shown in FIG. 3.

B is the speed light device composed as is shown in FIG. 4. In FIG. 4, 401 is the current source, 402 the current source switch and, 403 the voltage step up circuit consisting of the transistor 403A, the coil 403B connected to the collecter of the transister 403A, a series circuit consisting of the condenser 403D and the coil 403C and being connected between the base and the emitter of the above mentioned transistor 403A, the coil 403E composing a transformer together with the above mentioned coils 403B and 403C, and the resistance 403E connected to the coil 403E. 404 is the diode for rectifying the output of the voltage step up circuit, 405 the main condenser for storing the flash light energy, 406 the resistance, 407 the diode, 408 the condenser connected in series to the resistance 406 and the diode 407, 409 the neon tube which lights up when the main condenser is charged up to the determined voltage, 410 the switching transistor whose base is connected to the neon tube 409, so as to be closed when the neon tube lights up, 411 the FET, 412 the variable resistance and 413 the diode, whereby FET 411 and the variable resistance 412 compose a constant current circuit. 414 is the resistance connected to the output terminal of the constant current circuit, 415 the speed light discharge tube and 416 the thyrister connected in series to the discharge tube, whereby the gate of the thyrister is connected to the diode 417E of the trigger circuit 417 consisting of the condenser 417A, the coils 417B, 417C and diodes 417D and 417E so as to be closed by the output of the trigger circuit 417. 418 is the resistance, 419 the condenser and 420 the resistance whereby the condenser 420 discharges through the thyrister and the resistance 420 when the thyrister 421 is closed so as to open the thyrister and stop the discharge of the discharge tube 415. 422 is the light adjusting circuit whereby, the 422A is the light sensing element, 422B the condenser, 422C and 422D the transister forming a differential amplifier, 422E the resistance for setting the standard level on the differential amplifier and 422F the power transister whereby, the emitter of the transister 422F is connected to the gate of the above mentioned thyrister. 423 is the thyrister connected to the above mentioned condenser 408 whereby, its gate is connected to the diode 417D of the above mentioned trigger circuit so as to be closed by the output of the trigger circuit in such a manner that the condenser 408 is discharged whereby, the determined voltage is produced by the Zener diode 424 for a certain determined time so as to be applied to the above mentioned light adjusting circuit. The switch 425, the transister 426 and the Zener diode 427 make a circuit for detecting the charged state of the condenser 419. $t_{15}'$ to $t_{17}'$ and $t_{21}''$ are the terminals for engaging the speed light device with the camera body, $t_{16}'$ the terminal for the external exposure control signal terminal, $t_{15}'$ the synchronization terminal and $t_{17}'$ the output terminal for the charge completion signal for producing a positive output when the speed light device has been charged.

C is the interval timer, $t_{22}'$ to $t_{24}'$ are the engagement terminals with the electrical driving device D, whereby $t_{22}'$ is the current source terminal, $t_{23}'$ the release terminal and $t_{24}'$ the earth terminal.

$S_{20}$ is the timer release switch, $VR_1$ the variable resistance for setting a certain determined interval time, $C_3$ the condenser for setting a certain determined interval time, $PUT_1$ the programmable unijunction transistor, $R_7$ to $R_9$ the resistances, $D_4$ and $D_5$ the diodes and $C_4$ the condenser whereby, these components are connected as is shown in the drawing.

D is the electrical driving device. $E_6$ is the current source and $S_2$ the switch which is opened when the speed light device is used. (Hereby for the sake of the simplicity of explanation the switch is provided in the electrical driving device, while it can be provided in the camera body as is shown in FIG. 2). $S_{22}$ is the release switch at the side of the electrical driving device and $S_{23}$ the switch provided parallel to the switch $S_{16}$, for controlling the current supply to the light measurement indication circuit of the camera. $S_{24}$ is the switch for changing over the photography picture by picture to the continuous photography and $S_{25}$ and $S_{26}$ the main switches.

The transisters $Tr_4$ to $Tr_7$, the resistance $R_{10}$ to $R_{17}$, the diodes $D_6$ to $D_8$ and $S_{21}$ and $S_{22}$ compose the gate circuit for controlling the camera release.

The transisters $Tr_8$ to $Tr_{12}$ and the resistances $R_{18}$ and $R_{19}$ compose the circuit for controlling the film winding up motor M while the transisters $Tr_{13}$ and $Tr_{14}$, the diode $D_9$ and the resistances $R_{20}$ and $R_{21}$ compose the brake circuit of the motor M. $D_{10}$ is the protection diode.

The transisters $Tr_{15}$ and $Tr_{16}$, the resistances $R_{22}$ and $R_{23}$, the condenser $C_5$, the variable resistance $VR_2$ and the Flip-Flop circuit 72 compose the release timer circuit.

The transisters $Tr_{17}$ and $Tr_{21}$, the illuminating diode $D_{11}$, the diode $D_{12}$, the resistances $R_{22}$ to $R_{24}$, the condenser $C_6$ and the Flip-Flop circuit 76 compose the delay circuit for the protection at the time of the abnormal operation.

The diodes $D_{13}$ and $D_{14}$ and the resistance $R_{25}$ compose the circuit for changing over the photography picture by picture to the continuous photography.

The transisters $Tr_{18}$ and $Tr_{19}$, the diodes $D_{15}$ and $D_{16}$, the resistances $R_{26}$ to $R_{30}$, and the condenser $C_7$ compose the current source control circuit which closes the current source circuit by releasing, and opens it at the termination of the winding up operation. $S_{23}$ is the switch which is closed when the release timer is not used. $t_{17}''$, $t_{18}''$ to $t_{21}'$ are the terminals for engaging the speed light device with the camera body A, $t_{22}$ to $t_{24}$ the terminals for engaging the speed light device with the interval timer C and $t_{25}$ the terminal for engagement with the data registration device E, whereby they are connected as is shown in the drawing.

Figure 5:
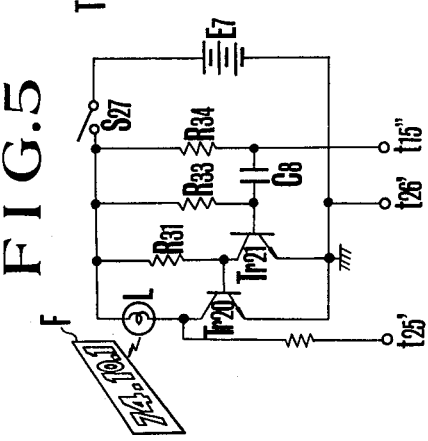
FIG. 5 shows a circuit diagram of an embodiment of the data registrating device shown in FIG. 3.

E is the data registration device which can be composed as a ten-key circuit as is shown in the drawing, whereby here for the sake of simplicity it is composed as a circuit for exposing the data to the film to the registering light source during the determined time. The data registration device is composed as is shown in FIG. 5. In FIG. 5, $E_7$ is the current source, $S_{27}$ the main switch, $R_{33}$ and $R_{34}$ the resistances and $C_8$ the condenser whereby, the condenser $C_8$ has been charged through the resistance $R_{34}$. $Tr_3$ is the transister whose base is connected to the connecting point of the resistance $R_{33}$ and the condenser $C_8$, $R_{31}$ the resistance connected to the collecter of the transister $Tr_{21}$ and $Tr_{20}$ the transister whose base is connected to the resistance $R_{31}$ whereby the data registering lamp L is connected to the collecter of the transister $Tr_{20}$. Hereby F is the data film which presents the data to be registered. $t_{15}''$ is the terminal connected to the above mentioned switch $S_{18}$, $t_{25}'$ the engagement terminal with the electrical driving device D and $t_{26}'$ the earth terminal.

Figure 7C:
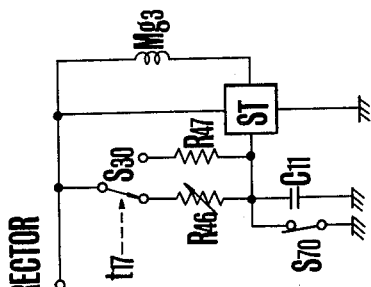
FIG. 7 (a), (b) and (c) respectively shows a circuit diagram of an embodiment of the exposure control circuit 69, the release mechanism driving circuit 70 and the shutter time control circuit 71.
Figure 7B:
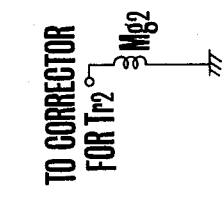
Figure 6:
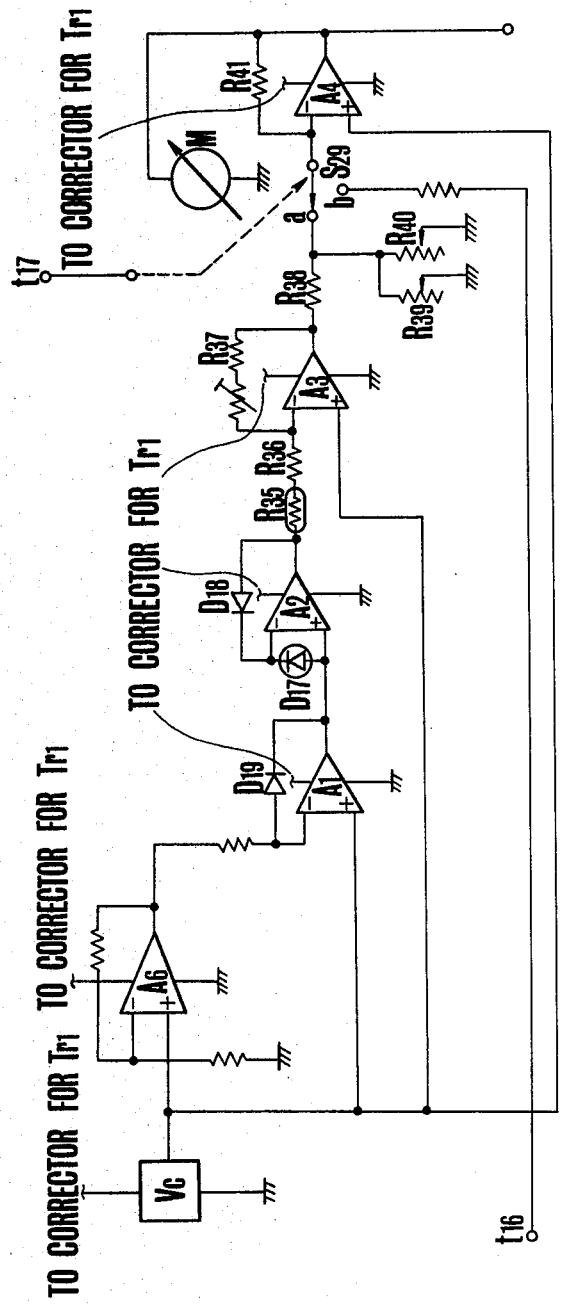
FIG. 6 shows a circuit diagram of an embodiment of the light measurement indication circuit 68 shown in FIG. 3.

FIG. 6 shows an embodiment of the light measurement indication circuit 68 shown in FIG. 3, whereby $Vc$ is the voltage constant circuit connected to the collecter of the transister $Tr_1$, in such a manner that its output is delivered to the operation amplifier $A_6$ so as to be amplified. $A_1$ is the amplifier between whose input terminals the diode $D_{17}$ is connected and whose output terminal is connected to the input terminal of the operation amplifier $A_2$ so as to serve as the circuit for making the temperature compensation of the light measurement circuit consisting of the operation amplifier $A_2$, the photo-voltaic element $D_{17}$ for light measurement and the logarithmically compressing diode $D_{18}$. $R_{35}$ is the temperature compensation resistance connected to the output terminal of the operation amplifier $A_2$, $R_{36}$ the resistance, $A_3$ the operation amplifier and $R_{35}$ the resistance connected between the input and the output terminal of the operation amplifier $A_3$, so as to compose the temperature compensating circuit together with the operation amplifier $A_3$. $R_{39}$ is the variable resistance for ASA sensitivity setting, being in functional engagement with the film sensitivity setting dial, not shown in the drawing, $R_{40}$ the variable resistance for shutter time information setting in functional engagement with the shutter time setting dial, not shown in the drawing and $A_4$ the operation amplifier between whose input terminals the resistance $R_{41}$ is connected and show output terminal is connected to the above mentioned operation amplifier $A_3$ and the variable resistances $R_{39}$ and $R_{40}$ so as to operate the output of the light measurement circuit and the set exposure information and produce the voltage corresponding to the aperture value for the proper exposure. M is the exposure value indication meter connected to the output terminal of the operation amplifier $A_4$, and $S_{29}$ the changing over switch which is changed from the contact a over to the contact b in response to the charge completion signal from the above mentioned terminal $t_{17}$, whereby when $S_{29}$ is connected to the contact b the above mentioned speed light device delivers the aperture control signal to the operation amplifier $A_4$ through the terminal $t_{16}$. FIG. 7 (a) shows an embodiment of the exposure control circuit 69 shown in FIG. 3, whereby $S_{28}$ is the switch connected to the output terminal of the operation amplifier $A_4$ in FIG. 6, so as to apply the output of the operation amplifier $A_4$ to the condenser $C_9$, whereby the switch $S_{28}$ is opened in functional engagement with the camera driving mechanism not shown in the drawing and driven by the magnet $Mg_1$ to be explained later. $A_5$ is the operation amplifier, $R_{42}$ the resistance, and $CP_1$ is the comparater whose one input terminal is connected to the output terminal of the above mentioned constant voltage circuit Vc and whose other input terminal is connected to the above mentioned operation amplifier $A_5$ and the resistance $R_{43}$. The resistance $R_{43}$ is functionally engaged with the preset member, not shown in the drawing, so as to change the value in such a manner that when the value corresponds to that determined by the voltage corresponding to the aperture value stored in the condenser $C_9$, the comparater $CP_1$ is inverted and the magnet $Mg_1$ does not operate any more whereby the preset member holding means, not shown in the drawing and attracted by the magnet $Mg_1$ holds the preset member so as to decide the position of the present member. FIG. 7(b) shows an embodiment of the release mechanism driving circuit shown in FIG. 3, whereby $Mg_2$ is the magnet connected to the collecter of the transister $Tr_2$ in FIG. 3. When the magnet $Mg_2$ is excited, the mirror, not shown in the drawing, and the front shutter plane are operated. FIG. 7(c) shows an embodiment of the shutter time control circuit 71 in FIG. 3, whereby $C_{11}$ is the condenser, $R_{46}$ the variable resistance functionally engaged with the shutter time setting dial so as to change the value and $R_{47}$ the fixed resistance presenting a value corresponding to the shutter time (say 1/60 sec.) suited for the flash light photography. $S_{70}$ is the count switch connected in parallel to the condenser $C_{11}$ and so composed as to be opened in functional engagement with the running of the front shutter plane, not shown in the drawing. ST is the Schmidt trigger circuit whose input terminal is connected to the output terminal of the delay circuit consisting of the above mentioned condenser $C_4$ and the resistance $R_{46}$ and $R_{47}$, and whose output terminal is connected to the magnet $Mg_3$. The magnet $Mg_3$ serves to keep the running of the rear shutter plane, not shown in the drawing. $S_{30}$ is the changing over switch which is changed from the resistance $R_{46}$ over to the resistance $R_{47}$ by means of the charge completion signal from the speed light device through the terminal $t_{12}$.

Below the operation of the electrical circuit composed as mentioned above will be explained. Suppose that the camera is in the wound up state (namely in the closed state of the switch $S_{19}$) and the speed light device is in the charged state when the speed light device is used. At first the case the interval timer is not used will be explained. The main switches $S_{25}$ and $S_{26}$ in the electrical driving device D are closed. In case the speed light device is used the main switch 402 of the speed light device is closed while the switch $S_{21}$ is opened. In case the data registration device is used, the main switch $S_{27}$ of the data registration device is closed. In case the release timer is not used, the switch $S_{23}$ is closed. Thus, the speed light device is not in the charged state so that the transister 410 is in the switched-on state and the terminal $t_{17}''$ is at the positive potential, the transister $Tr_4$ is in the switched-on state and the diode $D_6$, being reverse biased, is in the non-conductive state. (In case the speed light device is not used, by closing the switch $S_{21}$ the diode $D_6$ is reverse biased and in the non-conductive state.) Further because the camera is in the wound up state, the switch $S_{19}$ is closed and therefore the base current flows through the transister $Tr_5$ through the terminals $t_{18}$, $t_{18}'$, the switch $S_{26}$ and the resistance $R_{12}$ in such a manner that the transister $Tr_5$ is in the switched-on state while the diode $D_7$, being inversedly biased, is in non-conductive state.

Further, when the release switch $S_{22}$ in the electrical driving device D is closed the base current of the transister $Tr_{18}$ flows through the resistance $R_{29}$ and the switch $S_{23}$ whereby the transister $Tr_{18}$ is brought in the switched-on state so as to supply current to the circuit in the electrical driving device D from the current source $E_6$. Further by the closure of the switch $_{22}$ the diode $D_8$ is reverse biased so as to be brought in the non-conductive state whereby the transister $Tr_6$ is brought in the switched-off state in such a manner that the base current of the transister $Tr_7$ flows through the resistances $R_{16}$ and $R_{17}$ so as to be brought in the switched-on state. Hereby the signal that the transister $Tr_6$ is brought in the switched-off state is applied as the set signal to the set terminal S of the Flip-Flop circuit 72, whereby the $\overline{Q}$ output of the Flip-Flop circuit 72 becomes "O". In consequence, the base and the emitter being short-circuited, the transister $Tr_{15}$ is opened so that the release timer circuit starts to count the time set by the variable resistance $VR_2$ and the condenser $C_5$.

On the other hand, when the transister $Tr_7$ is brought in the switched-on state the transister $Tr_1$ is brought in the switched-on state through the terminals $t_{19}'$, $t_{19}$, the resistances $R_2$ and the diode $D_2$, while the transister $Tr_2$ is brought in the switched on state through the resistance $R_4$ and the diode $D_3$. When the transister $Tr_1$ is brought in the switched-on state the light measurement indication circuit shown in FIG. 6 starts to operate. Namely, when the transister $Tr_1$ is brought in the switched-on state the constant voltage circuit Vc starts to operate so as to apply the constant voltage to the operational amplifier A, and the amplified voltage of Vc to the other input terminal of $A_1$ through the operational amplifier $A_6$. Further the operational amplifier $A_1$ produces the determined voltage so as to apply the determined bias voltage to the operational amplifier $A_2$ which delivers the voltage logarithmically compressed by the diode $D_{18}$, of the brightness of the object light beam sensed by the photo-voltaic element $D_{17}$ through the photographic lens to the operation amplifier $A_3$ and transmitted to the one input terminal of the operational amplifier $A_4$ through the operational amplifier $A_3$ and the switch $S_{29}$ (which is connected to the contact a because in case of the day-light photography the charge completion signal is not applied to the terminal $t_{17}$).

Figure 7A:
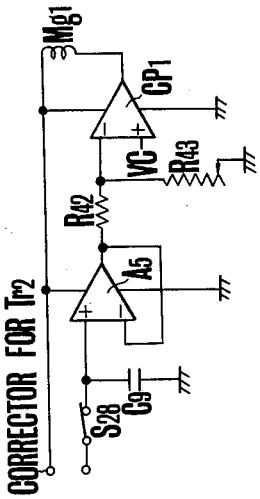

The above mentioned input terminal of the operation amplifier $A_1$ is connected to the resistances $R_{39}$ and $R_{40}$ which assums the values corresponding to the film sensitivity and the shutter time while the output of the operation amplifier $A_4$ represents the value operational out of the voltage corresponding to the brightness put in through the above mentioned $A_3$ and the film sensitivity and the shutter time set as the resistance values, namely the value corresponding to the aperture value, which is indicated by the indication device M. Further in case of the flash light photography the charge completion signal is put in through the terminal $t_{17}$ and the switch $S_{27}$ has been changed from the contact a over to the contact b in such a manner that the aperture signal suited for the flash light photography is put in the operational amplifier $A_4$ from the speed light device through the terminal $t_{16}$ so that the operational amplifier $A_4$ produces a value corresponding to the aperture signal suited for the flash light photography. On the other hand, when the transister $Tr_2$ is brought in the switched on state, the base current of the transister $Tr_3$ flows through the resistance $R_5$, so that the transister $Tr_3$ is also brought in the switched-on state. When the transister $Tr_3$ is brought in the switched-on state, the base current of the transister $Tr_2$ flows through the resistance $R_4$ and the diode $D_2$ so as to keep the transisters $Tr_1$ to $Tr_3$ in the switched-on state even if the release switch $S_{22}$ is opened. Further, when the transister $Tr_2$ is brought in the switched-on state, current is supplied to the release mechanism driving circuit 70, the exposure control circuit 69 and the shutter time control circuit 71. When current is supplied to the release mechanism driving circuit 70, as is shown in FIG. 7(b) the preset member, not shown in the drawing, is driven by the release magnet $Mg_2$ in such a manner that the diaphragm is closed down to the aperture value determined by the exposure control circuit while the mirror is raised up and then the front shutter plane is allowed to start. Namely as is shown in FIG. 7(a) the exposure control circuit 69 transmit the output of the operational amplifier $A_4$ of the above mentioned light measurement indication circuit to the condenser $C_9$ through the switch $S_{28}$ so as to charge the condenser with the output of $A_4$ and to determine the output of the operational amplifier $A_5$. Because at this time, the magnet $Mg_2$ in FIG. 7(b) is excited, the preset member not shown in the drawing is driven in such a manner that the output of the operational amplifier $A_5$ to be put in the comparator $CP_1$ is varied by means of the resistance $R_{43}$ whose value is varied in functional engagement with the preset member, whereby when the resistance value comes to correspond to the value corresponding to the voltage stored in the condenser $C_9$ the comparator $CP_1$ is inversed and the magnet $Mg_1$ is not excited any more so that the present member and the holding member, not shown in the drawing, are driven. Thus, the position of the preset member is determined while the diaphragm is closed down to the position and the mirror not shown in the drawing is raised up, allowing the front shutter plane to start to run. Hereby the switch $S_{28}$ is opened in functional engagement with the upwards movement of the mirror. When the front shutter plane starts to run, the shutter time control circuit (FIG. 7(c)) opens the switch $S_{70}$. The condenser $C_{11}$ starts to be charged through the resistance whose value corresponds to the shutter time preset by means of the shutter dial, not shown in the drawing, and after the elapse of the determined time the magnet $Mg_3$ is actuated so as to allow the rear shutter plane to start to run. Further, in case of the flash light photography the charge completion signal is applied to the switch 30 from the speed light device through the terminal $t_{17}$, so that the switch 30 is changed over to the resistance $R_{47}$, whereby the shutter time is determined in accordance with the value of the resistance $R_{47}$ (for example the value corresponding to 1/60 sec.). When the front shutter plane has run the X contact switch $S_{18}$ is closed as to open the terminals $t_{15}''$ and $t_{21}''$ in FIG. 4, so that the charge stored in the condenser 417A is discharged through the coil 417B, whereby the switching-on signal is applied to the gate of the thyrister 416 through the diode 417E so as to bring the thyrister 416 in the switched-on state, while the flash light discharge tube starts to discharge. Further, at this time the switching-on signal is applied also to the gate of the thyrister 423 through the diode 417D so that the thyrister 423 is brought in the switched-on state and the charge stored in the condenser 408 is discharged through the thyrister 423 and the Zener diode 424. Hereby the voltage between the terminals of the Zener diode 424 is constant for a certain determined time and applied to the light adjusting circuit 422 so as to bring the circuit 422 in the operational state, whereby the flash light reflected by the object reaches the photo voltaic element 422A in such a manner that when the reflected flash light reaches a certain determined amount the transistor 422F is brought in the switched-on state so as to bring the thyrister 421 in the switched-on state. When the thyrister 421 is brought in the switched-on state, the charge in the condenser 419 is discharged through the thyrister 421 and the resistance 420 so as to bring the thyrister 416 in the switched-off state and stop the flash light. As soon as the flash light has terminated the speed light device starts to be charged. In case the data registeration device is used, the potential at the terminal $t_{15}''$ in FIG. 5 is lowered when the switch $S_{18}$ is closed, whereby the lowered potential is applied to the base of the transistor $Tr_{21}$ through the condenser $C_8$, so as to bring the transistor $Tr_{21}$ in the switched-off state whereby the transistor $Tr_{21}$ is brought in the switched-on state. Thus, the lamp L continues to light up until the condenser $C_8$ is charged up to the determined level through the resistance $R_{33}$, so that the film F presenting the data is illuminated for the determined time so as to print the data on the film. Thus the base current of the transistor $Tr_{11}$ in the electrical driving device flows through the resistance $R_{32}$ and the terminals $t_{25}'$ and $t_{25}$ while the transistor $Tr_{20}$ remains in the switched-on state (namely while the data is being registered) so as to be brought in the switched-on state. (In case the data is not registered the main switch $S_{27}$ of the data registeration device E is opened so that the transistors $Tr_{20}$ is always in the switched-off state and therefore the transistor $Tr_{11}$ is also always in the switched-off state.)

Thus when the release switch $S_{22}$ is closed the light measurement and the indication are carried out, whereby the release mechanism driving circuit 70, the exposure control circuit 69 and the shutter time control circuit 71 operate so as to determine the aperture and allow the front shutter plane to start to run. Further when the speed light and the data registeration device are used at this time, the flash light photography is carried out with the speed light while the data is registered. As explained above, when the shutter time control circuit 71 in the camera body A has counted the set shutter time, the rear shutter plane is allowed to start to run by means of the magnet $Mg_3$ for the rear shutter plane in the circuit 71. When the rear shutter plane has run the switch $S_{19}$ is opened whereby all the current supply in the camera body A is interrupted and the holding circuits are all resolved. The switching-off signal of the switch $S_{19}$ is applied to the electrical driving device D through the terminals $t_{13}$, $t_{13}'$, whereby in the electrical driving device D the transistor $Tr_3$ is brought in the switched-off state, the base current being interrupted. When the switch $S_{24}$ is in the switched-off state (namely, in case of the continuous photography) the transistor $Tr_5$ is brought in the switched-off state so that the transistor $Tr_8$ is brought in the switched-off state, the base current being interrupted.

On the other hand, when the release timer has counted the time determined by the variable resistance $VR_2$ and the condenser $C_5$, the base current of the transister $Tr_{16}$ flows so as to bring the transistor $Tr_{16}$ in the switched-on state. When the transistor $Tr_{16}$ is brought in the switched-on sate the base current of the transistor $Tr_{10}$ flows so as to bring the transistor $Tr_{10}$ in the switched-on state. When the transistor $Tr_{10}$ is brought in the switched-on state the transister $Tr_9$ is inversedly biased between the emitter and the base so that the transistor $Tr_9$ is brought in the switched-off state. (In case the release timer is not used, the switch $S_{28}$ is closed so that the transistor $Tr_9$ is always in the switched-off state, being short circuited between the emitter and the base.) When the transistor $Tr_8$, $Tr_9$ and $Tr_{11}$ are brought in the switched-off state, the base current of the transister $Tr_{12}$ flows though the resistance $R_{15}$ so as to bring the transister $Tr_{12}$ in the switched-on state in such a manner that the current is supplied to the motor M through the diode $D_9$ so as to start the winding up. As explained above, at the time when the camera has terminated the exposure, the switch $S_{19}$ is opened and the transistor $Tr_8$ is brought in the switched-off state, while at the time point at which the release timer has terminated the counting or when the release timer is not used the transistor $Tr_9$ is brought in the switched-off state and at the time point at which the data has been registered or the data registeration device is not used, the transister $Tr_{11}$ is brought in the switched-off state. Therefore at the time point at which the camera has exposed, the release timer has terminated the counting and the data has been registered (at the time point at which the camera has exposed and the release timer has terminated the counting in case the data registeration device is not used, at the time point at which the camera has exposed and the data has been registered in case the release timer is not used and at the time point at which the camera has exposed in case both the release timer and the data registeration device are not used.) the transistor $Tr_{12}$ is brought in the switched-on state so as to start the winding up. When the winding up operation has been terminated, the switch $S_{19}$ at the side of the camera is closed. When the switch $S_{19}$ is closed the base current of the transistor $Tr_5$ flows through the resistance $R_{12}$, so as to bring the transistor $Tr_5$ in the switched-on state and the base current of the transistor $Tr_3$ flows through the resistance $R_{13}$, so as to bring the transistor $Tr_3$ in the switched-on state, whereby the transistor $Tr_{12}$ is brought in the switched-off state, being short circuited between the base and the emitter in such a manner that the current supply to the motor M is interrupted, while due to the electromotive force of the motor M itself the transistors $Tr_{14}$ and $Tr_{13}$ are brought in, switched-on state. Thus the both terminals of the motor M are short circuited by $Tr_{13}$ so as to brake the motor and stop the motor M immediately.

When the transistor $Tr_{12}$ is brought in the switched-on state and the winding up operation is started, the Flip-Flop circuit 72 is reset by the reset signal so that the transistor $Tr_{15}$ is brought in the switched-on state so as to short circuit the both terminals of the condenser $C_5$. On the other hand, when the transistor $Tr_{12}$ is brought in the switched-on state the Flip-Flop circuit 76 is set whereby, the transistor $Tr_{12}$ is brought in the switched-off state and the delay circuit starts to count the time set by the resistance $R_{22}$ and the condenser $C_6$. The time since the condenser $C_6$ starts to be charged through the resistance $R_{22}$ till the transistor $Tr_{17}$ becomes conductive due to the charged voltage of the condenser $C_6$ is set longer than what is needed for the normal winding up operation, as is explained in accordance with FIG. 2 and therefore, in case the winding up operation is carried out normally when the transistor $Tr_{17}$ is brought in the switched-on state, the transistor $Tr_8$ is brought in the switched-on state while the transistor $Tr_{12}$ is brought in the switched-off state whereby, the winding up operation has been terminated before the current supply to the motor M is interrupted. At this time, the switch $S_{19}$ in the camera body has been closed so that the transistor $Tr_5$ is brought in the switched-on state and the reset signal is applied to the Flip-Flop circuit 76 so as to reset the circuit 76 whereby, the transistor $Tr_{21}$ is brought in the switched-on state and the charge in the condenser $C_2$ is discharged. In case the winding up operation can not be carried out, for example, because the determined number of photographs have been taken, after the delay circuit has counted the set time the transistor $Tr_{17}$ is brought in the switched-on state and therefore the transistor $Tr_8$ is brought in the switched-on state while the transistor $Tr_{12}$ is brought in the switched-off state so as to interrupt the current supply to the motor and stop the winding up. At this time, the illuminating diode $D_{11}$ lights up so as to indicate the irregularity of the camera.

On the other hand, when the normal winding up has been carried out the transistor $Tr_5$ is brought in the switched-on state as explained above. Therefore the base current of the transistor $Tr_6$ through the resistance $R_{13}$ and the diode $D_7$ is interrupted. Further, when the speed light device has been charged the transistor 410 in the speed light device B is brought in the switched-on state and the base currrent of the transistor $Tr_4$ flows through the terminals $t_{17}'$ and $t_{17}''$ and the resistance $R_{10}$ (the switch $S_{21}$ is closed when the speed light device is not used) so that the base current of the transistor $Tr_6$ through the resistance $R_{11}$ and the diode $D_6$ is interrupted. When at this time, the release switch in the electrical driving device D is closed the base current of the transistor $Tr_6$ through the resistance $R_{14}$ and the diode $D_8$ is also interrupted. All the base current being interrupted, the transistor $Tr_6$ is brought in the switched-off state while the transistor $Tr_7$ is brought in the switched-on state so that the shutter of the camera can be released from the beginning as explained above. When the release is being pushed down, at the time point at which the winding up operation has been terminated and the speed light device has been charged, and in case the speed light device is not used at the time point at which the winding up operation has been terminated the shutter is released from the beginning. By repeating the above mentioned operation the continuous photography is carried out.

In case the switch $S_{24}$ is closed (namely in case of photography picture by picture), even if the rear shutter plane has run and the switch $S_{19}$ is opened, so far as the release switch $S_{22}$ is closed the base current of the transistor $Tr_8$ flows through the resistance $R_{25}$ and the diode $D_{14}$ so as to bring the transistor $Tr_8$ in the switched-on state, whereby the transistor $Tr_{12}$ is in the switched-off state so that the motor M does not rotate and the winding up operation does not start. When the release switch $S_{22}$ is closed the transistor $Tr_6$ is brought in the switched-on state, whereby if both of the above mentioned transistor $Tr_9$ and $Tr_{11}$ are in the switched-on state, the transistor $Tr_{12}$ is brought in the switched-on state so that the current is supplied to the motor M so as to start the winding up operation. When the winding up operation has been terminated the motor M stops as explained above, whereby because the release switch $S_{22}$ has already be opened, the base current of the transistor $Tr_6$ flows through the resistance $R_{14}$ and the diode $D_8$ so as to bring the transistor $Tr_6$ in the switched-on state while the transistor $Tr_7$ is in the switched-off state so that the shutter is not released. When hereby the release switch $S_{22}$ is closed the photography picture by picture can be carried out in the same way as explained above.

Below the current source control circuit in the electrical driving device will be supplimentarily explained. When the release switch $S_{22}$ is closed, the base current of the current source control transistor $Tr_{18}$ flows through the resistance $R_{29}$ so as to bring the transistor $Tr_{18}$ in such a manner that the circuit in the electrical driving device becomes conductive. When as explained above the shutter is released and the transistor $Tr_3$ is brought in the switched-on state, the base current of the transistor $Tr_{18}$ flows through the diode $D_{18}$ so as to keep the transistor $Tr_{18}$ in the switched-on state. When the shutter has been released the main switch $S_{19}$ in the circuit A is opened whereby, the transistor $Tr_3$ is brought in the switched-off state while the transistor $Tr_{19}$ is kept in the switched-on state through the resistance $R_{26}$ so that the transistor $Tr_{18}$ is kept in the switched-on state. When the winding up operation has been terminated and the switch $S_{10}$ is closed, the transistor $Tr_5$ is closed so as to interrupt the base current of the transistor $Tr_{19}$ through the diode $D_{15}$, whereby the transistor $Tr_{19}$ is brought in the switched-off state.

The above mentioned operation are carried out by the release switch $S_{22}$ in the electrical driving device D. Below the operation to be carried by the release switch $S_{17}$ in the camera body A will be explained. Suppose that the camera is in the wound up state. When the release switch $S_{17}$ is closed, the same conditions prevail in the transistor $Tr_7$ in the electrical driving device, so that in the same way as explained above the shutter is released. When the camera has terminated the exposure the switch $S_{19}$ is opened whereby, if the release timer and the data registration device have completed their operation the winding up operation is carried out (In case the release timer and the data registration device are not used, the winding up operation is carried out at the time point at which the camera has completed the exposure.). When the winding up operation has been terminated while the release switch $S_{17}$ continues to be pushed down, the shutter is released from the beginning no matter whether the speed light device is charged or not, because the transistor $Tr_7$ is in a state equivalent to the switched-on state.

Below the operation of the interval timer C will be explained. In the present embodiment the timer C is operated, being supplied with the current from the electrical driving device D.

When the release switch $S_{20}$ in the interval timer C is closed the base current of the transistor $Tr_{22}$ flows through the condenser $C_4$ so as to bring the switch $S_{20}$ in the switched-on state, serving in the equivalent way to the case the switch $S_{22}$ in the motor drive is closed, so as to release the shutter. The operation after this is same as in the above mentioned case that the switch $S_{22}$ is closed.

When the release switch $S_{20}$ continues to be pushed down, the oscillating element $PUT_1$ operates with the time interval determined by the variable resistance $VR_1$ and the time constant condenser $C_3$ for setting the interval, whereby the charge stored in $C_3$ is discharged as the base current of the transistor $Tr_{22}$ through the resistance $R_9$ so as to bring the transistor $Tr_{22}$ in the switched-on state and interrupt the base current of the transistor $Tr_6$ through the resistance $R_{14}$ and the diode $D_8$. Thus in case the interval timer is used, the next shutter is released at the point in time at which the first picture has been taken, the film has been wound up, the base current of the transistor $Tr_6$ through the resistance $R_{13}$ and the diode $D_7$ has been interrupted, the speed light device has been charged, the base current of the transistor $Tr_6$ through the resistance $R_{11}$ and the diode $D_{11}$ has been interrupted (in case the speed light device is not used the base current of the transistor $Tr_6$ is always interrupted through the resistance $R_{11}$ and the diode $D_6$ because the switch $S_{21}$ is closed) and the interval timer has counted the time so as to interrupt the base current of the transistor $Tr_6$ through the resistance $R_{14}$ and the diode $D_8$. Further when, by applying the external trigger signal to the external trigger terminal J, the terminals $t_{23}$ and $t_{24}$ are short circuited, it is possible to interrupt the base current of the transistor $Tr_6$ through the resistance $R_{14}$ and the diode $D_8$ even before the interval timer has terminated the counting, so that it is possible to release the shutter by the external trigger signal even before the interval timer has terminated the counting.

As explained above in detail in accordance with the present invention it is possible to offer an electrical driving system of a camera universally adoptable for any photographic conditions because the three timers, namely the shutter timer, the release timer and the interval timer can optionally be used in such a manner either the continuous photography with the shorter photographing period (equation (1)) decided by the shutter time and the winding up time, the continuous photography with a constant release time by means of a camera with priority on aperture value with the photographing period (equation (2)) determined by the release timer and the winding up time, the continuous photography with a fully constant photographing period by means of the interval timer or the continuous photography, in which the shutter is released by means of the external trigger signal such as of the oscilloscope, can be carried out. Further in accordance with the present invention the shutter is released only after the speed light device has been charged in case the speed light device is used, so that even in case of the continuous photography with speed light it is possible to actuate the speed light device without fail for every picture. Further the film is wound up only after the data has been registered in case the data registration device is used so that it is possible to offer an electrical driving system of a camera enabling the sure registration of data no matter how long the time is for such registration. Hereby it is to be noted that the camera, the speed light device, the electrical driving device, the interval timer and the data registration device can either be incorporated in one unit or separated from each other. Further it goes without saying that the release timer can be composed separately from the electrical driving device.

What is claimed is:

1. An electrical driving circuit for repeating a shutter release operation of a camera operated with an electric flash device and at least a shutter charge operation by a film winding up means comprising:

a. a release period control means for producing a first signal for controlling said shutter release with a certain determined period, said means also controlling the shutter release with the determined period by means of the first signal;

b. a film winding up signal producing means for detecting the operational state of the above mentioned film winding means, said signal producing means producing a second signal when the film winding up means reaches a certain determined operational state;

c. a ready signal producing means for producing a third signal when the electric flash device is ready for operation; and d. a shutter release control means for detecting said first, second and third signals so as to prohibit the shutter release by means of the first and second signals when the third signal has not been produced before the first and second signals are produced.

2. An electrical driving circuit according to claim 1, which includes a release period control off signal producing means which produces a release period control off signal, said shutter release control means controlling the shutter release operation solely by means of said second signal in response to the release period control off signal.

3. An electrical driving circuit according to claim 1 which includes an external trigger signal input terminal connected to said shutter release control means, said electrical driving circuit controlling the shutter release operation in response to an input signal from said terminal and to said second and third signals.

4. An electrical circuit for repeating a shutter release operation of a camera operated with an electric flash device and at least a shutter charge operation by a film winding up means comprising:

a. a film winding signal producing means for detecting the operational state of said film winding up means, said means producing a first signal for controlling said shutter release operation when the film winding up means reaches a certain determined operational state;

b. a ready signal producing means for producing a second signal when the electric flash device is ready for operation; and c. a shutter release control means for detecting said first and second signals so as to prohibit the shutter release by means of said first signal when the second signal has not been produced before the first signal is produced.

5. An electrical driving circuit for repeating a shutter release operation of a camera operated with an electric flash device comprising:

a. a release period control means for producing a first signal for controlling said shutter release with a certain determined period, said means also controlling the shutter release with the determined period by means of the first signal;

b. a ready signal producing means for producing a second signal when the electric flash device is ready for operation; and c. a shutter release control means for detecting said first and second signals so as to prohibit the shutter release by means of the first signal when the second signal has not been produced before the first signal is produced.

6. A photographing system having an electric flash device and an electrical driving circuit provided for repeating at least a shutter charge operation by a shutter-release and film-winding-up means, said system comprising:

a. the electric flash device for producing a flash light including a ready signal producing means for producing a first signal when said electric flash device is ready for operation;

b. the electrical driving circuit including a film winding up signal producing means for detecting the state of operation of said film winding up means, said means producing a second signal for controlling said shutter release operation when the film winding up means reaches a certain determined state of operation; and c. a shutter release control means for detecting said first and second signals so as to prohibit the shutter release by means of said second signal when the first signal has not been produced before the second signal is produced.

7. A system according to claim 6 wherein said electrical driving circuit includes an electric flash off signal producing means for producing an electric flash off signal; and said shutter release control means controls the shutter release operation solely by means of said second signal in response to the electric flash off signal.

8. A photographing system having an electric flash device and an electrical driving circuit provided for repeating at least a shutter charge operation by a shutter-release and film-winding-up means, said system comprising:

a. the electric flash device for producing a flash light including a ready signal producing means for producing a first signal when said electric flash device is ready for operation;

b. the electrical driving circuit including a release period control means for producing a second signal for controlling said shutter release with a certain determined period; and c. a shutter release control means for detecting said first and second signals for controlling said shutter release operation so as to prohibit the shutter release by means of said second signal when the first signal has not been produced before the second signal is produced.

9. A photographing system having an electrical driving circuit provided for repeating at least a shutter charge operation by shutter-release and film-winding-up means, said system comprising:

a. a camera including a shutter time control means for controlling a shutter time control operation;

b. a data registration means for registering data on the film; and c. the electrical driving circuit including a winding up operation control means for detecting the state of data registration operation by the data registration means so as to drive said film-winding-up means only when the data registration operation has been completed after completion of the shutter time control operation by the shutter time control means.

10. A system according to claim 9 wherein said winding up operation control means includes an AND function circuit which detects completion of the shutter time control operation by said shutter time control means and completion of the data registration operation by said data registration means; and said film winding up means is driven by an output of the AND function circuit.

11. A photographing system according to claim 9 wherein said electrical driving circuit includes a data registration operation off signal producing means which produces a data registration operation off signal; and said winding-up operation control means is arranged to drive the film winding up means, in response to said off signal, upon completion of the shutter time control operation made by said shutter time control means.

12. A photographing system comprising:
1. an electric flash device including:
   a. a flash light energy storing means, and
   b. a first switching means for switching and producing a flash device signal when a certain determined amount of flash light energy has been stored in the means; and
2. An electrical driving circuit comprising:
   a. a current source,
   b. a magnet means for the shutter release,
   c. a shutter time control timer which is functionally engaged with the magnet means so as to start time counting by virtue of said magnet and which produces an exposure completion signal after a certain determined period of time,
   d. a second switching means for switching in accordance with the exposure completion signal,
   e. a film winding up motor to be supplied with a current by the switching of the second switching means,
   f. a winding up operation means functionally engaged with the motor so as to carry out at least a shutter charge operation,
   g. a winding up signal producing means functionally engaged with the winding up means so as to produce a winding up completion signal when the winding up means has terminated the operation, and
   h. a third switching means for switching in accordance with an AND output of the winding up completion signal and the flash device signal, said third switching means being connected to the current source and the shutter release magnet means so as to supply a current to the magnet means by switching.

13. A system according to claim 12 said electrical driving circuit including an interval timer for producing a release signal with a certain determined period and said third switching means being operated by the AND output of the winding up completion signal, the flash device signal and said release signal from the internal timer.

14. In a camera having a shutter time control means for controlling shutter time, an electrical driving circuit to be used in combination with a data registration means for repeating a shutter release operation of the camera and at least a shutter charge operation by a film winding up means, the electrical driving circuit comprising:
   a. a release period control means for producing a first signal for controlling said shutter release with a certain determined period, said means also controlling the shutter release with the determined period by means of the first signal;
   b. a film winding up signal producing means for detecting the state of operation of said film winding up means, said means producing a second signal when the film winding up means reaches a certain determined operational state;
   c. a shutter release control means for detecting the first and second signals so as to prohibit the shutter release by means of the first signal when the second signal has not been produced before the first signal is produced; and
   d. a winding up operation control means for detecting the state of data registration operation by the data registration means for registering the data on the film so as to drive the film winding up means only when the data registration operation has been completed after completion of exposure by the shutter time control means.

* * * * *